US012700617B2

(12) United States Patent
Hall et al.

(10) Patent No.: US 12,700,617 B2
(45) Date of Patent: Aug. 4, 2026

(54) DIFLUOROPHOSPHATE ADDITIVE COMPOUNDS AND METHODS THEREOF FOR USE IN ENERGY STORAGE DEVICES

(71) Applicant: Tesla, Inc., Austin, TX (US)

(72) Inventors: David S. Hall, Palo Alto, CA (US);
Toren Hynes, Palo Alto, CA (US);
Connor P. Aiken, Palo Alto, CA (US);
Jeffery R. Dahn, Palo Alto, CA (US)

(73) Assignee: TESLA, INC., Austin, TX (US)

( * ) Notice: Subject to any disclaimer, the term of this patent is extended or adjusted under 35 U.S.C. 154(b) by 636 days.

(21) Appl. No.: 17/904,781

(22) PCT Filed: Feb. 25, 2021

(86) PCT No.: PCT/US2021/019695
§ 371 (c)(1),
(2) Date: Aug. 22, 2022

(87) PCT Pub. No.: WO2021/173851
PCT Pub. Date: Sep. 2, 2021

(65) Prior Publication Data
US 2023/0065400 A1 Mar. 2, 2023

Related U.S. Application Data

(60) Provisional application No. 62/981,923, filed on Feb. 26, 2020.

(51) Int. Cl.
*H01M 10/0567* (2010.01)
*H01M 4/02* (2006.01)
(Continued)

(52) U.S. Cl.
CPC ....... *H01M 10/0567* (2013.01); *H01M 4/364* (2013.01); *H01M 4/386* (2013.01);
(Continued)

(58) Field of Classification Search
CPC .. H01M 10/0567; H01M 4/364; H01M 4/386; H01M 4/583; H01M 10/0525;
(Continued)

(56) References Cited

U.S. PATENT DOCUMENTS

2010/0099031 A1 4/2010 Kato et al.
2011/0111288 A1* 5/2011 Nishida ............... H01M 10/052
429/199
(Continued)

FOREIGN PATENT DOCUMENTS

JP 2004-031079 1/2004
JP 2007-165125 6/2007
(Continued)

OTHER PUBLICATIONS

International Search Report and Written Opinion dated May 18, 2021, in application No. PCT/US2021/019695.

*Primary Examiner* — Nicholas A Smith
*Assistant Examiner* — Benjamin Eli Kass-Mullet
(74) *Attorney, Agent, or Firm* — Knobbe, Martens, Olson & Bear, LLP

(57) ABSTRACT

The present disclosure relates to the synthesis and evaluation of difluorophosphate additives for use in energy storage devices. The difluorophosphate additive may be selected from the group consisting of lithium difluorophosphate (LFO), sodium difluorophosphate (NaFO), ammonium difluorophosphate (AFO), tetramethylammonium difluorophosphate (MAFO), potassium difluorophosphate (KFO), and combinations thereof. In some instances, the difluorophosphate additive is not lithium difluorophosphate (LFO).

20 Claims, 8 Drawing Sheets

(51) Int. Cl.

| | |
|---|---|
| *H01M 4/36* | (2006.01) |
| *H01M 4/38* | (2006.01) |
| *H01M 4/583* | (2010.01) |
| *H01M 10/0525* | (2010.01) |
| *H01M 10/0568* | (2010.01) |
| *H01M 10/0569* | (2010.01) |
| *H01M 10/44* | (2006.01) |

(52) U.S. Cl.
CPC ....... *H01M 4/583* (2013.01); *H01M 10/0525* (2013.01); *H01M 10/0568* (2013.01); *H01M 10/0569* (2013.01); *H01M 10/446* (2013.01); *H01M 2004/027* (2013.01); *H01M 2004/028* (2013.01)

(58) Field of Classification Search
CPC ......... H01M 10/0568; H01M 10/0569; H01M 10/446; H01M 2004/027; H01M 2004/028
See application file for complete search history.

(56) References Cited

U.S. PATENT DOCUMENTS

| | | | |
|---|---|---|---|
| 2016/0013517 A1* | 1/2016 | Nakazawa ............ | H01M 4/386 |
| | | | 429/188 |
| 2016/0064774 A1 | 3/2016 | Lee et al. | |
| 2017/0054178 A1* | 2/2017 | Sakaguchi ........ | H01M 10/0525 |
| 2018/0034105 A1* | 2/2018 | Ohashi .............. | H01M 10/0525 |
| 2019/0006659 A1 | 1/2019 | Hagiwara et al. | |
| 2019/0044184 A1* | 2/2019 | Takada .................. | H01M 4/525 |
| 2019/0252689 A1* | 8/2019 | Xu ...................... | H01M 4/8878 |
| 2019/0393546 A1 | 12/2019 | Dahn et al. | |

FOREIGN PATENT DOCUMENTS

| | | |
|---|---|---|
| JP | 2008-269982 | 11/2008 |
| JP | 2011-065986 | 3/2011 |
| JP | 2013-069580 | 4/2013 |
| JP | 5239119 B2 * | 7/2013 |
| JP | 2016-143536 | 8/2016 |
| JP | 2019-518315 | 6/2019 |
| WO | WO 10/064637 | 6/2010 |
| WO | WO 15/046175 | 4/2015 |
| WO | WO 17/154908 | 9/2017 |

* cited by examiner

DIFLUOROPHOSPHATE ADDITIVE COMPOUNDS AND METHODS THEREOF FOR USE IN ENERGY STORAGE DEVICES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

This disclosure is generally related to electrolyte additives for use in energy storage devices. More specifically, this disclosure relates to difluorophosphate compounds used in lithium-ion batteries.

Description of the Related Art

Lithium-ion battery cells are an important component of energy-storage systems in portable electronics, power tools, electric vehicles, and grid energy storage. In some instances, the choice of electrolyte used in the battery affects battery performance.

Some lithium-ion cell electrolyte solutions include one or more chemical additives. Electrolyte additives are introduced into the electrolyte solution on the order of just a few weight percent and may affect the lifetime, safety, and performance of a cell. Some classes of electrolyte additives include cyclic carbonates, organic sulfates and sulfonates, Lewis adducts, alkyl-substituted phosphites and phosphates, and uncommon heterocycles. Another class of additives is lithium salts, including lithium difluorophosphate (LFO). However, because LFO is also a relatively expensive additive it is desirable to identify lower cost alternatives. Therefore, the development of new electrolyte additives and additive combinations may improve lithium-ion cell energy cells.

SUMMARY

For purposes of summarizing the disclosure and the advantages achieved over the prior art, certain objects and advantages of the disclosure are described herein. Not all such objects or advantages may be achieved in any particular embodiment. Thus, for example, those skilled in the art will recognize that the invention may be embodied or carried out in a manner that achieves or optimizes one advantage or group of advantages as taught herein without necessarily achieving other objects or advantages as may be taught or suggested herein.

In one aspect, an energy storage device is described. The energy storage device includes an anode, a cathode, a housing, and an electrolyte comprising a lithium salt, a solvent, and a difluorophosphate additive comprising sodium difluorophosphate (NaFO), wherein the anode, cathode and electrolyte are positioned within the housing.

In some embodiments, the difluorophosphate additive is a difluorophosphate salt. In some embodiments, the difluorophosphate additive further comprises an additional difluorophosphate additive selected from the group consisting of lithium difluorophosphate (LFO), ammonium difluorophosphate (AFO), tetramethylammonium difluorophosphate (MAFO), potassium difluorophosphate (KFO), and combinations thereof. In some embodiments, the difluorophosphate additive further comprises an additional difluorophosphate additive selected from the group consisting of ammonium difluorophosphate (AFO), tetramethylammonium difluorophosphate (MAFO), potassium difluorophosphate (KFO), and combinations thereof. In some embodiments, the additional difluorophosphate additive does not comprises lithium difluorophosphate (LFO). In some embodiments, the electrolyte comprises about 5 wt. % to about 0.1 wt. % of the difluorophosphate additive. In some embodiments, the electrolyte comprises about 1 wt. % of the difluorophosphate additive.

In some embodiments, the anode comprises an anode active material selected from the group consisting of a carbon material, a silicon material, a silicon-carbon (Si—C) composite material, and combinations thereof. In some embodiments, the carbon material is selected from the group consisting of graphitic material, graphite, a graphene-containing materials, a hard carbon, a soft carbon, carbon nanotubes, a porous carbon, a conductive carbon, and combinations thereof. In some embodiments, the cathode comprises a cathode active material selected from the group consisting of lithium nickel manganese cobalt oxide (NMC), lithium manganese oxide (LMO), lithium iron phosphate (LFP), lithium cobalt oxide (LCO), lithium titanate (LTO), lithium nickel manganese oxide (LNMO), lithium nickel cobalt aluminum oxide (NCA), lithium nickel manganese aluminum oxide (NMA) and combinations thereof.

In some embodiments, the lithium salt is selected from the group consisting of $LiPF_6$, $LiBF_4$, $LiClO_4$, $LiN(SO_2CF_3)_2$, $LiSO_3CF_3$, $LiB(C_2O_4)_2$, $LiN(SO_2F)_2$, $LiC_2BF_2O_4$, and combinations thereof. In some embodiments, the electrolyte comprises a solvent selected from the group consisting of ethylene carbonate (EC), propylene carbonate (PC), vinyl ethylene carbonate (VEC), vinylene carbonate (VC), fluoroethylene carbonate (FEC), dimethyl carbonate (DMC), diethyl carbonate (DEC), ethyl methyl carbonate (EMC), methyl acetate (MA), and combinations thereof.

In some embodiments, the device has a charge transfer resistance ($R_{ct}$) after formation at 4.3V of less than about 60 $cm^2$. In some embodiments, the device has a charge transfer resistance ($R_{ct}$) after formation at 4.4V of less than about 60 $cm^2$. In some embodiments, the device has a capacity after 2000 cycles relative to a capacity after a third cycle (Qd2000/Qd3) at 40° C. and upper cutoff voltage of 4.4V of at least about 0.8. In some embodiments, the device has a capacity after 2500 cycles relative to a capacity after a third cycle (Qd2500/Qd3) at 40° C. and upper cutoff voltage of 4.3V of at least about 0.8. In some embodiments, the energy storage device is a battery.

In another aspect, a method of fabricating an energy storage device is described. The method includes positioning an anode, a cathode and an electrolyte within a housing, wherein the electrolyte comprises a lithium salt, a solvent, and a difluorophosphate additive comprising sodium difluorophosphate (NaFO), sealing the housing to form an energy storage device, and forming a solid-electrolyte interphase (SEI) at the anode, wherein forming the SEI comprises charge cycling the energy storage device to a voltage of at least about 4.3V.

DETAILED DESCRIPTION

Figure 1:
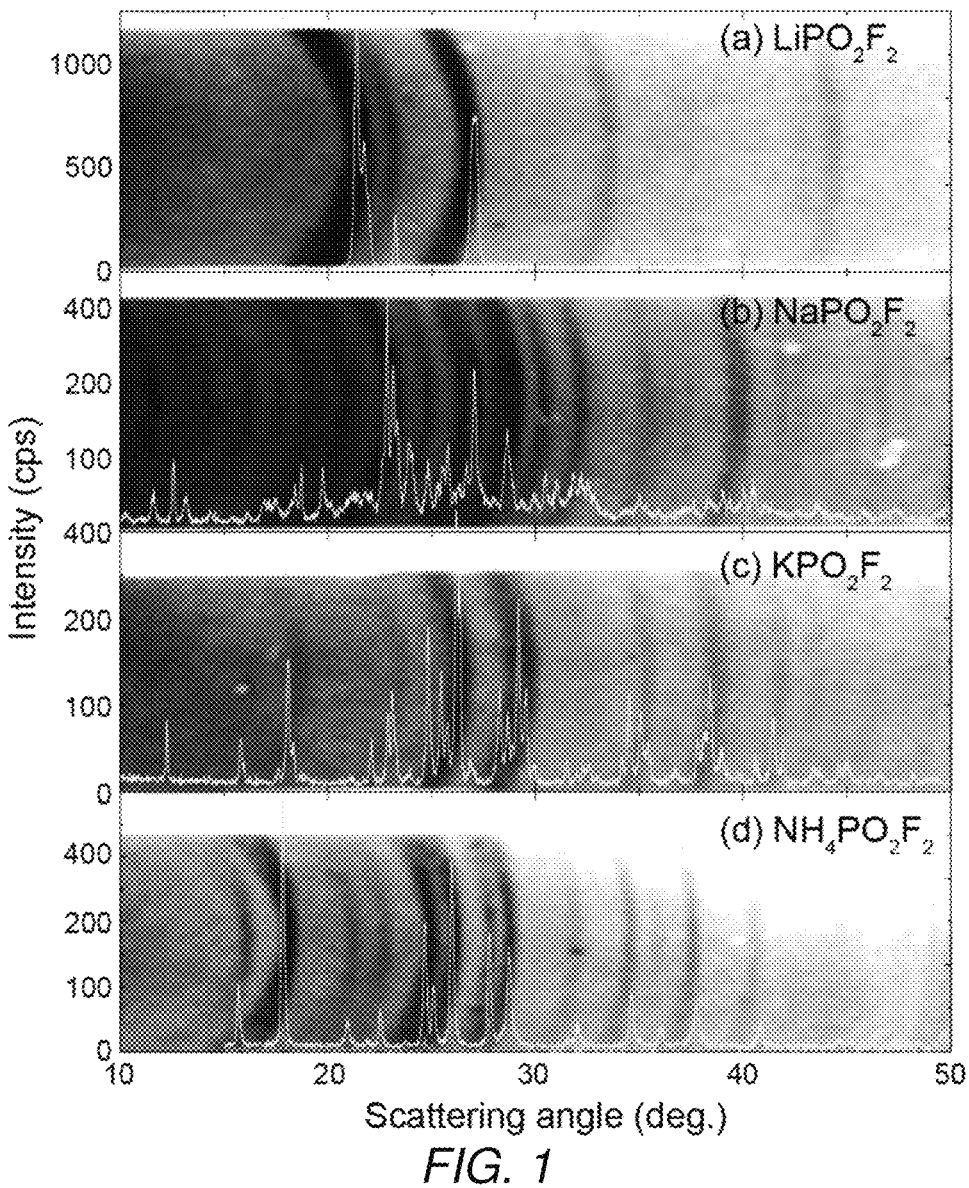
FIG. 1 shows line graphs of X-ray diffraction patterns in panel (a) a commercially purchased LFO; and samples of compositions produced as shown below, including samples in panel (b) NAFO; in panel (c) KFO; and in panel (d) AFO materials overlaid on standard diffraction patterns for each material, according to some embodiments.

The present disclosure may be understood by reference to the following detailed description, taken in conjunction with the drawings. It is noted that, for purposes of illustrative clarity, certain elements in various drawings may not be drawn to scale, may be represented schematically or conceptually, or otherwise may not correspond exactly to certain physical configurations of embodiments.

Embodiments relate to difluorophosphate compound electrolyte additives for energy storage devices. In some embodiments, energy storage device can be a lithium ion energy storage device such as a lithium ion capacitor, a lithium ion battery, or a hybrid lithium ion device that has characteristics of a battery and a capacitor. The difluorophosphate compounds described herein may significantly improve the lifetime, safety, and performance of lithium ion cells, including limiting electrochemical impedance growth, decreasing the rate of self-discharge during storage, increasing cell lifetime, limiting the evolution of gas, decreasing cathode resistance, and/or enhancing cyclability and rate capability.

In some embodiments, the difluorophosphate compound is a difluorophosphate salt. In some embodiments, the difluorophosphate salt comprises difuorophosphate and a counter cation. In some embodiments, the cation is selected from the group consisting of an elemental cation, a compound cation, and combinations thereof. In some embodiments, the cation is selected from the group consisting of an alkali metal, an alkali earth metal, a transition metal, or a combination thereof. In some embodiments, the cation is selected from the group consisting of lithium, sodium, ammonium, tetramethylammonium, potassium difluorophosphate, and combinations thereof. In some embodiments, the cation is selected from the group consisting of sodium, ammonium, tetramethylammonium, potassium difluorophosphate, and combinations thereof. In some embodiments, the difluorophosphate compound is selected from the group consisting of lithium difluorophosphate (LFO), sodium difluorophosphate (NaFO), ammonium difluorophosphate (AFO), tetramethylammonium difluorophosphate (MAFO), potassium difluorophosphate (KFO), and combinations thereof. In some embodiments, the difluorophosphate compound is selected from the group consisting of sodium difluorophosphate (NaFO), ammonium difluorophosphate (AFO), tetramethylammonium difluorophosphate (MAFO), potassium difluorophosphate (KFO), and combinations thereof. In some embodiments, the difluorophosphate compound comprises sodium difluorophosphate (NaFO). In some embodiments, the difluorophosphate additive further comprises an additional difluorophosphate additive selected from the group consisting of lithium difluorophosphate (LFO), ammonium difluorophosphate (AFO), tetramethylammonium difluorophosphate (MAFO), potassium difluorophosphate (KFO), and combinations thereof. In some embodiments, the difluorophosphate additive further comprises an additional difluorophosphate additive selected from the group consisting of ammonium difluorophosphate (AFO), tetramethylammonium difluorophosphate (MAFO), potassium difluorophosphate (KFO), and combinations thereof. In some embodiments, the cation does not comprise lithium. In some embodiments, the difluorophosphate compound does not comprise lithium difluorophosphate.

In some embodiments, a difluorophosphate compound is synthesized. In some embodiments, the synthesis method forms a difluorophosphate compound selected from the group consisting of lithium difluorophosphate, sodium difluorophosphate, ammonium difluorophosphate, tetramethylammonium difluorophosphate, potassium difluorophosphate, and combinations thereof.

In some embodiments, the difluorphosphate compound is added to an energy storage device electrolyte. In some embodiments, the energy storage device electrolyte is used in an energy storage device. In some embodiments, the energy storage device comprises a cathode, an anode, a separator positioned between the anode and cathode, an electrolyte, and a housing containing the anode, cathode, separator and electrolyte.

In some embodiments, the electrolyte comprises an amount of the difluorophosphate compound of, or of about, 9 wt %, 8 wt %, 7 wt %, 6 wt %, 5 wt %, 4 wt. %, 3 wt. %, 2.5 wt. %, 2 wt. %, 1.5 wt. %, 1 wt. %, 0.5 wt. %, 0.4 wt. %, 0.3 wt. %, 0.2 wt. %, 0.1 wt. % or 0.05 wt. %, or any range of values therebetween.

In some embodiments, the active material of the electrode (i.e. cathode or anode) of the energy storage device can be a carbon-based material or a battery material. In some embodiments, an active material can include a lithium metal oxide, sulfur carbon composite and/or a lithium sulfide. In some embodiments, active material may include lithium nickel manganese cobalt oxide (NMC), lithium manganese oxide (LMO), lithium iron phosphate (LFP), lithium cobalt oxide (LCO), lithium titanate (LTO), lithium nickel manganese oxide (LNMO), lithium nickel cobalt aluminum oxide (NCA), lithium nickel manganese aluminum oxide (NMA) and combinations thereof. In some embodiments, the active material may include other materials described herein. In some embodiments, active material may include one or more carbon materials, silicon materials, silicon-carbon (Si—C) composite materials, or combinations thereof. The carbon materials may be selected from, for example, graphitic material, graphite, graphene-containing materials, hard carbon, soft carbon, carbon nanotubes, porous carbon, conductive carbon, or a combination thereof. Activated carbon can be derived from a steam process or an acid/etching process. In some embodiments, the graphitic material can be a surface treated material. In some embodiments, the porous carbon can comprise activated carbon. In some embodiments, the porous carbon can comprise hierarchically structured carbon. In some embodiments, the porous carbon can include structured carbon nanotubes, structured carbon nanowires and/or structured carbon nanosheets. In some embodiments, the porous carbon can include graphene sheets. In some embodiments, the porous carbon can be a surface treated carbon. In preferred embodiments, the active material comprises, consists essentially of, or consists of graphite. In some embodiments, the silicon materials may be selected from, for example, Si and SiOx, and combinations thereof.

In further embodiments, the energy storage device is charged with a suitable lithium-containing electrolyte. For example, the device can include a lithium salt, and a solvent, such as a non-aqueous or organic solvent. Generally, the lithium salt includes an anion that is redox stable. In some embodiments, the anion can be monovalent. In some embodiments, a lithium salt can be selected from hexafluorophosphate ($LiPF_6$), lithium tetrafluoroborate ($LiBF_4$), lithium perchlorate ($LiClO_4$), lithium bis(trifluoromethansulfonyl)imide ($LiN(SO_2CF_3)_2$), lithium trifluoromethansulfonate ($LiSO_3CF_3$), lithium bis(oxalato)borate ($LiB(C_2O_4)_2$), lithium bis(fluorosulfonyl)imide ($LiN(SO_2F)_2$), lithium difluoro(oxalato)borate ($LiC_2BF_2O_4$) and combinations thereof. In some embodiments, the electrolyte can include a quaternary ammonium cation and an anion selected from the group consisting of hexafluorophosphate, tetrafluoroborate and iodide. In some embodiments, the salt concentration can be about 0.1 mol/L (M) to about 5 M, about 0.2 M to about 3 M, or about 0.3 M to about 2 M. In further embodiments, the salt concentration of the electrolyte can be about 0.7 M to about 1 M. In certain embodiments, the salt concentration of the electrolyte can be about 0.2 M, about 0.3 M, about 0.4 M, about 0.5 M, about 0.6 M, about 0.7 M, about 0.8 M. about 0.9 M, about 1 M, about 1.1 M, about 1.2 M, or values therebetween.

In some embodiments, an energy storage device can include a liquid solvent. The solvent need not dissolve every component, and need not completely dissolve any component, of the electrolyte. In further embodiments, the solvent can be an organic solvent. In some embodiments, a solvent can include one or more functional groups selected from carbonates, ethers and/or esters. In some embodiments, the solvent can comprise a carbonate. In further embodiments, the carbonate can be selected from cyclic carbonates such as, for example, ethylene carbonate (EC), propylene carbonate (PC), vinyl ethylene carbonate (VEC), vinylene carbonate (VC), fluoroethylene carbonate (FEC), and combinations thereof, or acyclic carbonates such as, for example, dimethyl carbonate (DMC), diethyl carbonate (DEC), ethyl methyl carbonate (EMC), methyl acetate (MA), and combinations thereof. In certain embodiments, the electrolyte can comprise $LiPF_6$, and one or more carbonates.

In some embodiments, the energy storage device is measured to have a charge transfer resistance ($R_{ct}$) after formation at 4.3V of, of about, of less than, or of less than about, 65 cm$^2$, 64 cm$^2$, 63 cm$^2$, 62 cm$^2$, 61 cm$^2$, 60 cm$^2$, 59 cm$^2$, 58 cm$^2$, 57 cm$^2$, 56 cm$^2$, 55 cm$^2$, 54 cm$^2$, 53 cm$^2$, 52 cm$^2$, 51 cm$^2$, 50 cm$^2$, 58 cm$^2$ or 45 cm$^2$, or any range of values therebetween. In some embodiments, the energy storage device is measured to have a transfer resistance ($R_{ct}$) after formation at 4.4V of, of about, of less than, or of less than about, 65 cm$^2$, 64 cm$^2$, 63 cm$^2$, 62 cm$^2$, 61 cm$^2$, 60 cm$^2$, 59 cm$^2$, 58 cm$^2$, 57 cm$^2$, 56 cm$^2$, 55 cm$^2$, 54 cm$^2$, 53 cm$^2$, 52 cm$^2$, 51 cm$^2$, 50 cm$^2$, 58 cm$^2$ or 45 cm$^2$, or any range of values therebetween. In some embodiments, the energy storage device is measured to have a capacity after 2000 cycles relative to the capacity of the third cycle (Qd2000/Qd3) at 40° C. and upper cutoff voltage of 4.4V of, of about, of at least, or of at least about, 0.7, 0.75, 0.8, 0.85, 0.9, 0.95, 0.96, 0.98 or 0.99, or any range of values therebetween. In some embodiments, the energy storage device is measured to have a capacity after 2500 cycles relative to the capacity of the third cycle (Qd2500/Qd3) at 40° C. and upper cutoff voltage of 4.3V of, of about, of at least, or of at least about, 0.7, 0.75, 0.8, 0.85, 0.9, 0.95, 0.96, 0.98 or 0.99, or any range of values therebetween.

A. Solid-State Synthesis of Difluorophosphate Salts

Embodiments relate to preparation of a range of difluorophosphate salts for testing as lithium-ion battery electrolyte additives. One difluorophosphate salt of interest is sodium difluorophosphate (NaFO). One such method of preparation is a solid-state synthesis of LFO prepared by mixing together solid lithium fluoride and phosphorus pentoxide powders and heating the mixture in a sealed tube. This method and an analogous reaction for producing NaFO were tested under a wide variety of conditions, such as an oven temperature ranged from 250-300° C. and a heating time ranged from 10 min-5 h. Following isolation of the difluorophosphate salts via Soxhlet extraction, synthetic yields ranged from 10-20%. LFO and NaFO reactions are shown in (1) and (2) below.

$$6LiF + 2P_2O_5 \xrightarrow{\Delta} 3LiPO_2F_2 + Li_3PO_4 \tag{1}$$

$$6NaF + 2P_2O_5 \xrightarrow{\Delta} 3NaPO_2F_2 + Na_3PO_4 \tag{2}$$

In contrast to the alkali salts, a similar reaction repeated with ammonium fluoride produced improved yields of ammonium difluorophosphate (AFO) according to reaction (3) shown below. It is noted that unlike the alkali salts, which require a sealed pressure tube and a high-temperature oven, the synthesis of AFO by this method may be performed open to air and requires only minimal heating on a hot plate to initiate the reaction. Therefore this approach was deemed suitable for the synthesis of AFO.

$$6NH_4F + 2P_2O_5 \xrightarrow{\Delta} 3NH_4PO_2F_2 + (NH_4)_3PO_4 \tag{3}$$

B. Synthesis of Difluorophosphate Salts Via Cation Exchange

A cation-exchange reaction was considered from AFO to prepare NaFO by the reaction shown in (4) below. Additional alkali difluorophosphate salts were also considered through a cation-exchange reaction, such as potassium difluorophosphate (KFO) through the reaction shown in (5) below. The cation-exchange reaction was successfully used to prepare NaFO with a reaction yield of 50%, and to prepare KFO with a reaction yield of 73%.

$$NaOtBu + NH_4PO_2F_2 \xrightarrow{(tBuOH)} NaPO_2F_2 + tBuOH + NH_3 \quad (4)$$

$$KOtBu + NH_4PO_2F_2 \xrightarrow{(tBuOH)} KPO_2F_2 + tBuOH + NH_3 \quad (5)$$

A synthesis of NaFO was performed from commercially purchased difluorophosphoric acid and the corresponding anhydrous metal chlorides, as shown in reaction (6) below. However, when this reaction was attempted, an insoluble mass formed in the reaction vessel and the glass walls of the flask were observed to have become severely etched. The etching was attributed to the formation of HF during the reaction, possibly due to water or other contaminants in the $HPO_2F_2$. Adding the acid to the metal chloride via distillation yielded similar unsuccessful results. The reaction also became very hot as the acid was added, making it unfavorable for practical use.

$$NaCl + HPO_2F_2 \rightarrow NaPO_2F_2 + HCl\uparrow \quad (6)$$

The evolution of hot gaseous acid in reaction (6) was desired to be avoid. Therefore, the reactions of difluorophosphoric acid with sodium carbonate as shown below in reaction (7) or with sodium bicarbonate shown below in reaction (8) were considered. In both cases, the reaction is expected to be thermodynamically driven by the evolution of carbon dioxide gas, although both produce water as an unwanted by-product. Since reaction (7) produces half the stoichiometric quantity of water as reaction (8), sodium carbonate is preferred in this regard.

$$Na_2CO_4 + 2HPO_2F_2 \xrightarrow{(DME)} 2NaPO_2F_2 + H_2O + CO_2\uparrow \quad (7)$$

$$NaHCO_3 + HPO_2F_2 \xrightarrow{(DME)} NaPO_2F_2 + H_2O + CO_2\uparrow \quad (8)$$

Reaction (7) was performed over a drying agent to avoid hydrolysis of the reactants or products. Use of a sodium sulfate, a relatively weak drying agent, produced a NaFO yield of 14%. When reaction (7) was retried using 3 Å molecular sieves, a very strong drying agent, the yield improved to 60%, and sufficient quantities of the product could be prepared for testing in lithium-ion cells.

C. Synthesis of Tetraalkylammonium Difluorophosphate Salts

Quaternary ammonium difluorophosphate salts were also synthesized for use as electrolyte additives in lithium-ion cells. Tetramethylammonium difluorophosphate (MAFO) was previously prepared from difluorophosphoric acid and tetramethylammonium chloride. However, given the difficulty repeating the analogous reaction (6), another approach was considered and adopted. The appropriate alkylammonium chloride salts were added to NaFO, such that precipitation of insoluble NaCl may drive the production of MAFO as shown in reaction (9), tetraethylammonium difluorophosphate as shown in reaction (10), and tetrabutylammonium difluorophosphate as shown in reaction (11) below.

$$NMe_4Cl + NaPO_2F_2 \xrightarrow{(MeCN)} NMe_4PO_2F_2 + NaCl\downarrow \quad (9)$$

$$NEt_4Cl + NaPO_2F_2 \xrightarrow{(MeCN)} NEt_4PO_2F_2 + NaCl\downarrow \quad (10)$$

$$NBu_4Cl + NaPO_2F_2 \xrightarrow{(MeCN)} NBu_4PO_2F_2 + NaCl\downarrow \quad (11)$$

Reaction (9) gave an MAFO yield of 67% with high purity, as determined by NMR. Reactions (10) and (11) were unsuccessful; following removal of the solvent, a small volume of oily residue remained in each reaction flask. Attempts to isolate any product from reactions (10) and (11) from the residues were unsuccessful.

X-Ray Diffraction of Difluorophosphate Salts

FIG. 1 shows diffraction patterns of in panel (a) a commercially purchased LFO; panel (b) NAFO; panel (c) KFO; and panel (d) AFO materials compared to their standards found in the literature. The X-ray patterns of $LiPO_2F_2$, $KPO_2F_2$ and $NH_4PO_2F_2$ match well with those of the standards. The pattern of $NaPO_2F_2$ shows a reasonable qualitative match.

Figure 2:
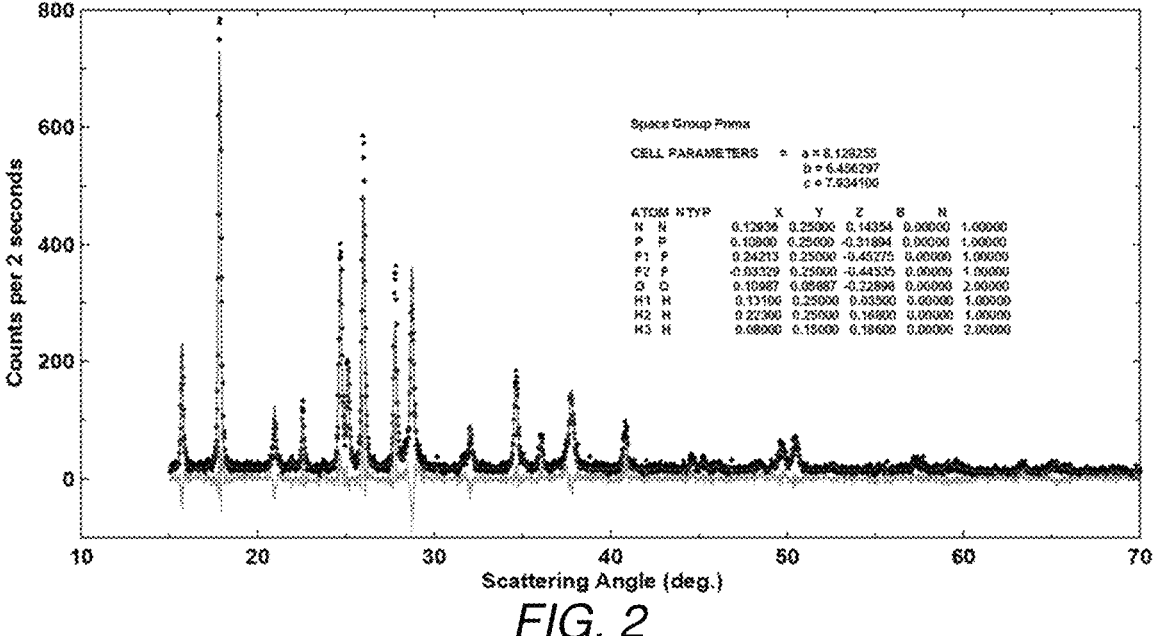
FIG. 2 shows a line graph of a $NH_4PO_2F_2$ diffraction pattern according to some embodiments.

FIG. 2 shows the Rietveld refinement of the $NH_4PO_2F_2$ diffraction pattern based on the crystal structure information. The high level of agreement between the measured and calculated patterns in FIG. 2 confirms that $NH_4PO_2F_2$ of high quality has been made.

D. NMR Characterization of the Difluorophosphate Additives

Figure 3:
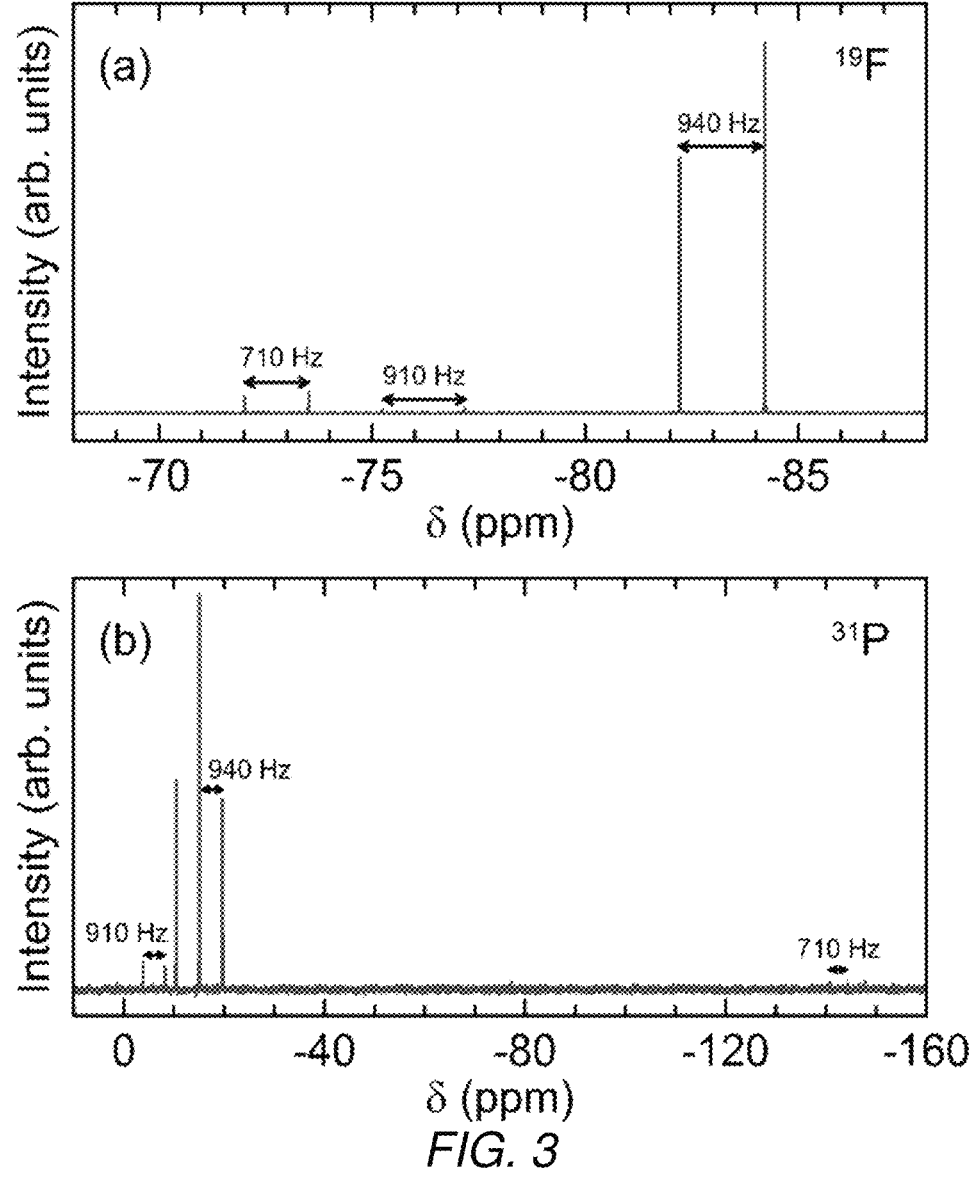
FIG. 3 shows panel (a) $^{19}F$ and panel (b) $^{31}P$ graphs of NMR spectra of NaFO according to some embodiments.

The reaction products of the difluorophosphate salts were characterized by $^{19}$F and $^{31}$P NMR spectroscopy. The spectra of NaFO is shown in FIG. 3. The panel (a) [19]F spectra of the difluorophosphate salts contain a doublet centred at approx. −83 ppm and the panel (b) [31]P spectra contain a triplet centred at approx. −15 ppm. The J-coupling between $^{19}$F and $^{31}$P atoms is on the order of 940 Hz. Such NMR spectra is consistent with literature spectra of the $PO_2F_2^-$ anion. In the case of the commercial LFO material, there are additional peaks in the $^{19}$F and $^{31}$P spectra that are shifted 0.13 ppm and 0.07 ppm, respectively. These extra peaks are attributed to $LiPO_2F_2$ ion pairs. This assignment is supported by a weak [7]Li-[19]F J-coupling constant of 8 Hz in one of the [91]F doublets.

The $^{19}$F and $^{31}$P spectra each contain an additional doublet, centered at −76 ppm and −8 ppm, respectively. These peaks have a [19]F-[31]P J-coupling constant of ~910 Hz and are attributed to small amounts of monofluorophosphate anion impurities, $PO_3F^{2-}$. The monofluorophosphate salts are low solubility by-products that were formed in small amounts for all of the syntheses tested in this work. Finally, some of the spectra measured in this work contain a doublet centered at approx. −74 ppm with a J-coupling constant of ~710 Hz is observed in the $^{19}$F spectrum of NaFO, as seen in FIG. 3, panel (a). This is a close match with the published literature position and splitting parameter of the hexafluorophosphate anion, $PF_6^-$. The corresponding $^{31}$P septet centered at −144 ppm is also observed in FIG. 3, panel (b), although only three of seven peaks are above the experimental detection limit.

E. Electrochemical Evaluation of Difluorophosphate Additives

Figure 4:
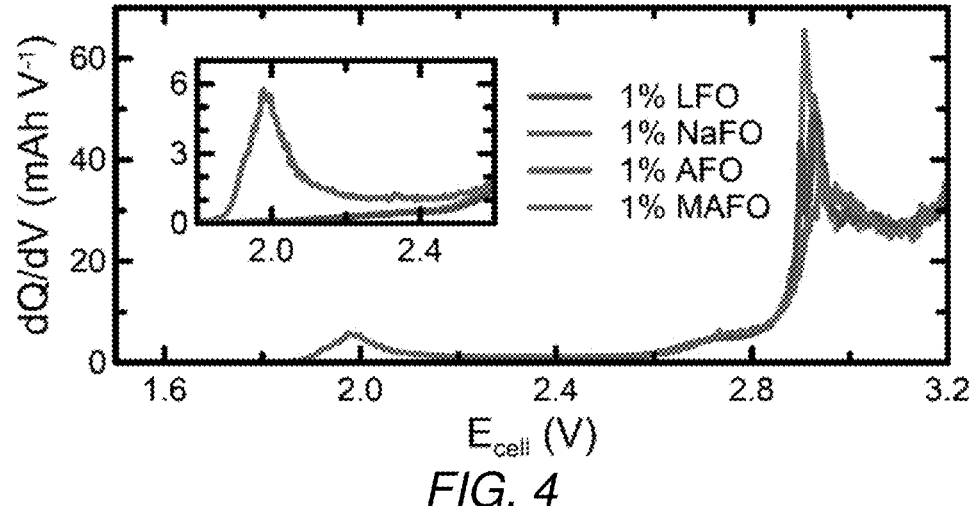
FIG. 4 shows a line graph of a differential capacity (dQ/dV) plot of solid-electrolyte interphase (SEI) formation during the first charge cycle of NMC532/graphite pouch cells prepared with 1% difluorophosphate salt additives according to some embodiments.

Three new difluorophosphate salt additives were synthesized and tested as electrolyte additives in this work: NaFO, AFO, and MAFO. Although KFO was successfully synthesized, its limited solubility made it unsuitable for testing in lithium-ion cells. The behaviour of NMC532/graphite (gr) pouch cells prepared with 1%, by weight, of each of the new additives are compared against the commercially obtained LFO additive. FIG. 4 shows the differential capacity (dQ/dV) plot of solid-electrolyte interphase (SEI) formation during the first charge cycle of a NMC532/gr pouch cells prepared with 1% LFO, NaFO, AFO and MAFO additives.

First, the differential capacity response at low cell voltages (1.5-3.2 V) of the formation cycle was examined. In all cases, there is a peak at ~2.9 V, corresponding to the formation of an SEI at the negative electrode via the electrochemical reduction of ethylene carbonate (EC). Cells that contained 1% AFO display an additional feature, centered at ~2.0 V. The additives differ only by their cations and this region corresponds to rapidly decreasing electrode potential at the negative. Therefore, this feature corresponds to the reduction of the ammonium cation. Without being bound by theory, a likely reduction scheme involves the production of lithium nitride and hydrogen gas as shown in reaction (12) below.

$$4e^- + 3Li^+ + NH_4^+ \rightarrow Li_3N_{(s)} + 2H_{2(g)} \tag{12}$$

Figure 5:
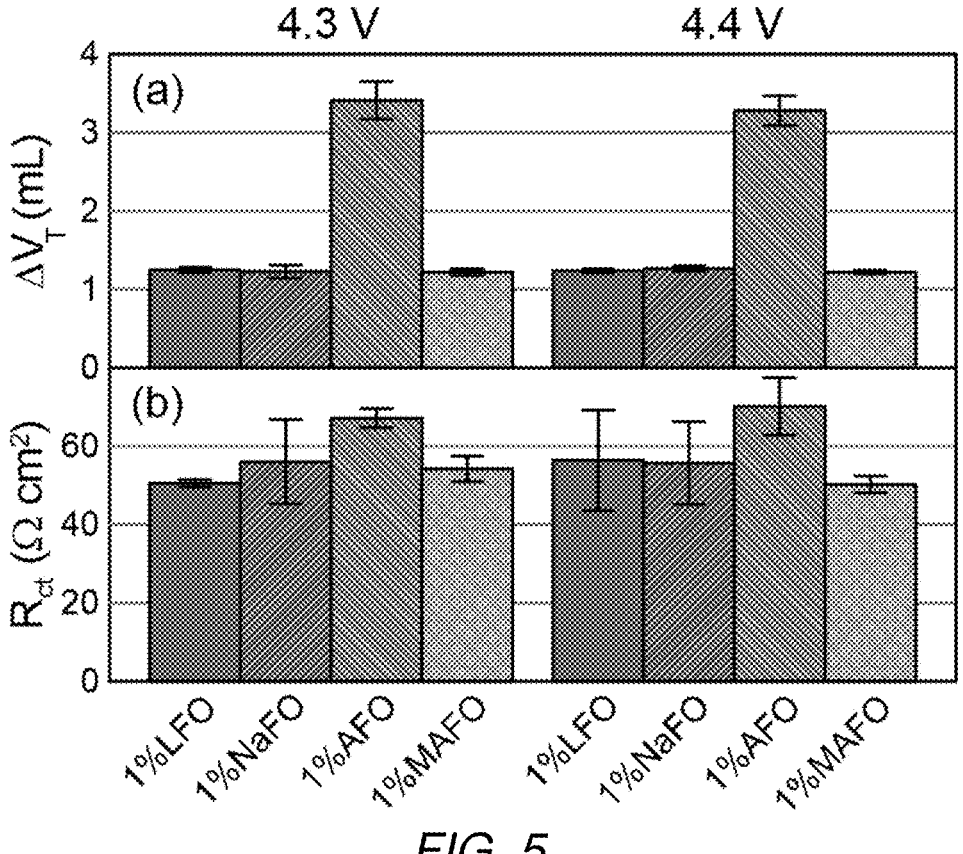
FIG. 5 shows bar graphs in panel (a) Total Volume change due to gas evolution; and panel (b) $R_{ct}$ measured after cell formation for NMC532/graphite cells prepared with 1% difluorophosphate salt additives according to some embodiments.

FIG. 5 shows bar graphs with panel (a) showing Total Volume change ($\Delta V_T$) due to gas evolution; and panel (b) showing $R_{ct}$ measured after cell formation for NMC532/gr cells prepared with 1% difluorophosphate salt additives. As seen in FIG. 5, panel (a), where the volume change due to gas evolution was measured following the formation cycle, there were no significant differences observed in the volume change of cells that contained LFO (about 1.25 mL $\Delta V_T$ at 4.3V and 4.4V), NaFO (about 1.25 mL $\Delta V_T$ at 4.3V and 4.4V), or MAFO (about 1.25 mL $\Delta V_T$ at 4.3V and 4.4V). Gas evolution in these cells is attributable to the evolution of ethylene and hydrogen as by-products of EC reduction. However, cells prepared with AFO (about 3.3 mL $\Delta V_T$ at 4.3V and 4.4V) produced more gas relative to the others, consistent with the expected $H_2$ evolution according to the proposed reaction (12). If one assumes 10 mg of additive per cell and ~22.4 L mol$^{-1}$ of gas, the expected volume of $H_2$ for reducing all of the added ammonium in the cell with AFO is ~3.8 mL. This is approximately the volume of gas that was produced in AFO-containing cells. It is noted that this value is not additive with the volume of gas in control cells, consistent with the observation that the EC reduction feature is mostly suppressed in AFO-containing cells as seen in FIG. 4.

Figure 6:
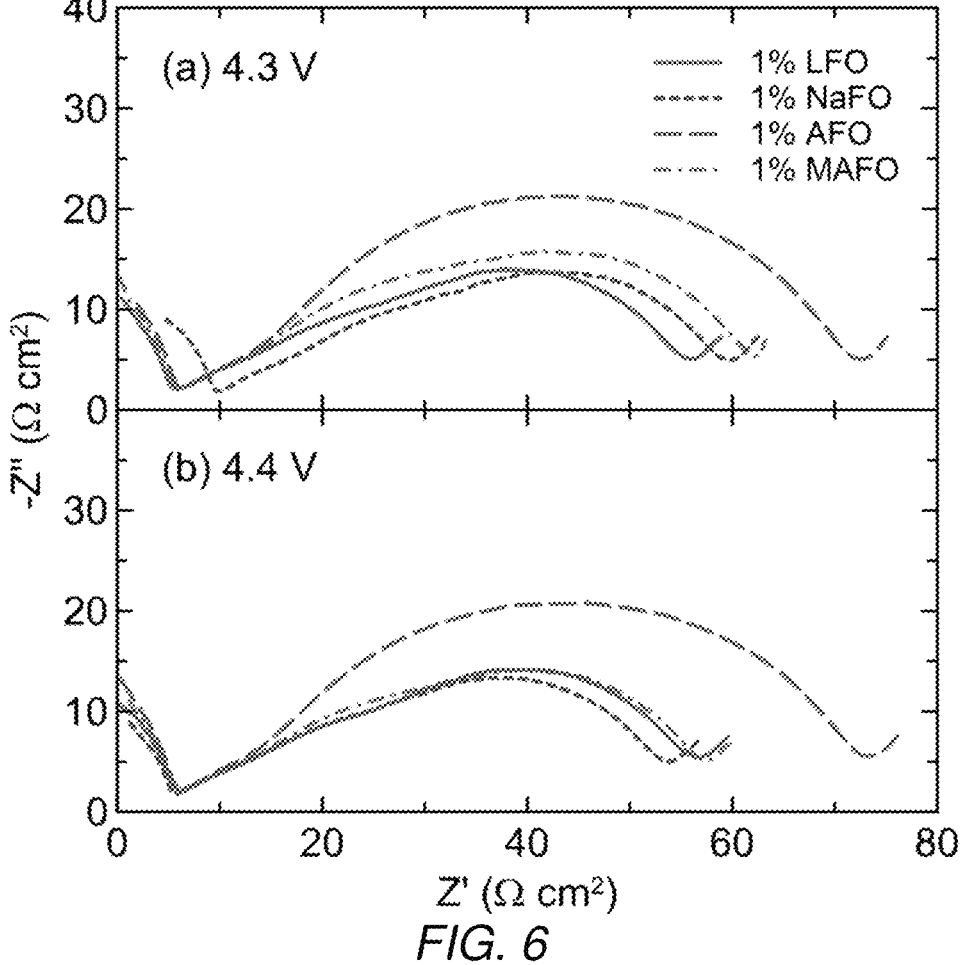
FIG. 6 shows line graphs of representative EIS Nyquist plots measured after cell formation from NMC532/graphite cells prepared with 1% difluorophosphate salt additives at panel (a) 4.3 V; and panel (b) 4.4 V.

As seen in FIG. 5, panel (b), the charge transfer resistance, $R_{ct}$, was also measured following the formation cycle. Here, $R_{ct}$ is taken as the diameter of the depressed semicircle in the Nyquist representation of the EIS spectrum. $R_{ct}$ represents a combination of Li-ion desolvation and transport of the lithium cation through the SEI layers at both the positive and negative electrodes. Similar to the gas results, there are no significant differences between the cells prepared with LFO (about 50 cm$^2$ $R_{ct}$ at 4.3V; and about 57 cm$^2$ $R_{ct}$ 4.4V), NaFO (about 56 cm$^2$ $R_{ct}$ at 4.3V; and about 56 cm$^2$ $R_{ct}$ 4.4V), and MAFO (about 55 cm$^2$ $R_{ct}$ at 4.3V; and about 50 cm$^2$ $R_{ct}$ 4.4V). The average $R_{ct}$ value from AFO-containing cells (about 70 cm$^2$ $R_{ct}$ at 4.3V; and about 75 cm$^2$ $R_{ct}$ 4.4V) is greater relative to the cells with LFO, NaFO, or MAFO. However, the variability between replicate cells is large, and therefore a conclusive statement with regard to $R_{ct}$ is not possible with a high degree of certainty. Representative Nyquist plots of the post-formation EIS data show a very similar shape for LFO—, NaFO—, and AFO-containing cells, as shown in FIG. 6 measured after cell formation from NMC532/gr cells prepared with 1% difluorophosphate salt additives at panel (a) 4.3 V, and at panel (b) 4.4 V, wherein the shape of the Nyquist plot for cells prepared with AFO is more semi-circular than that of LFO, NaFO, or MAFO. This supports that the first three additives lead to similar SEI compositions, whereas reduction of the ammonium cation produces a new SEI component.

Figure 7:
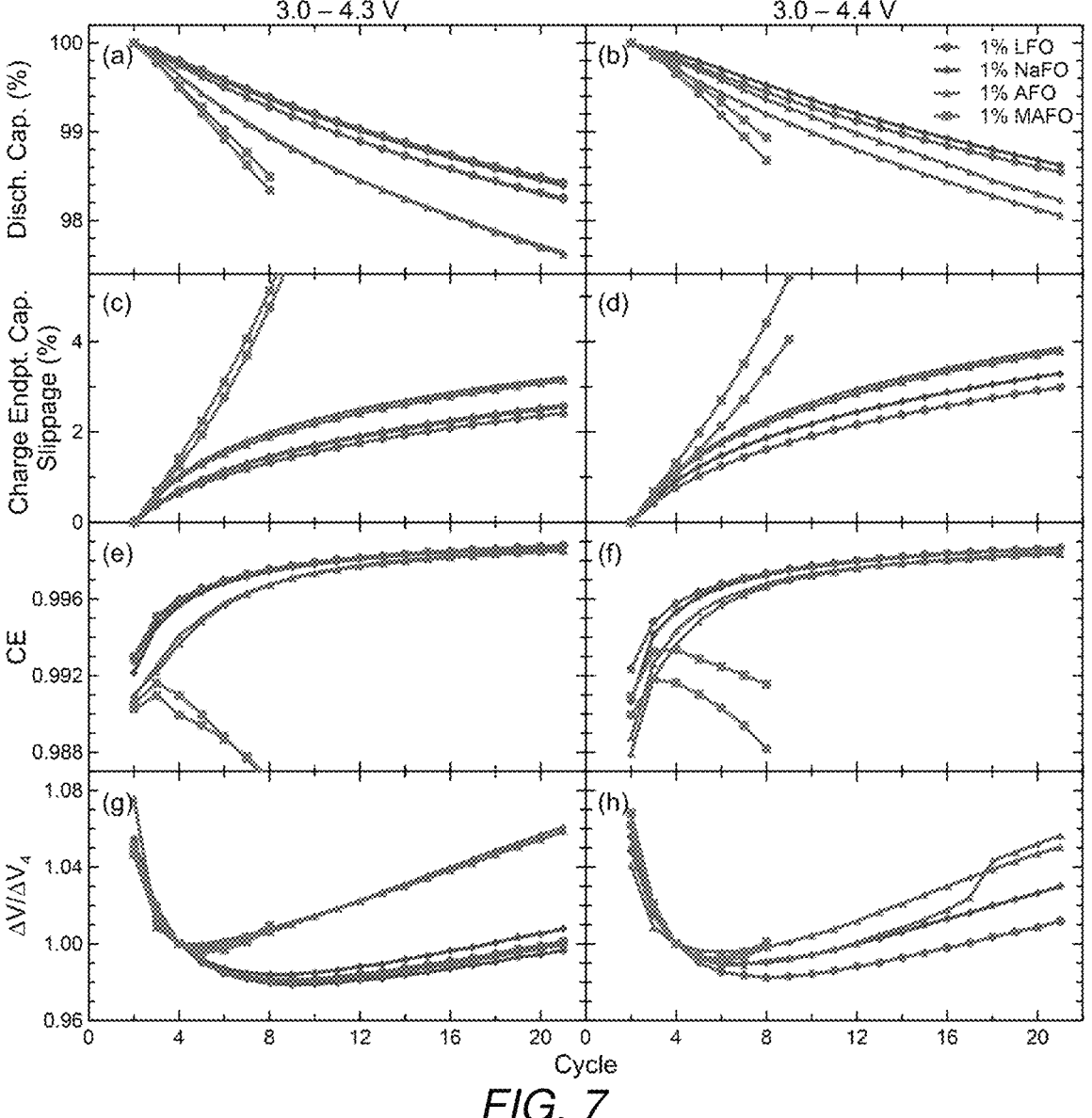
FIG. 7 shows line graphs of a panel (a) and panel (b) normalized discharge capacity; panel (c) and panel (d) charge endpoint capacity slippage (normalized to the second cycle); panel (e) and panel (f) coulombic efficiency; and panel (g) and panel (h) Volume change normalized to the fourth cycle measured during UHPC cycling of NMC532/gr pouch cells containing 1% difluorophosphate salt additives according to some embodiments.

Ultrahigh-precision coulometry (UHPC) cycling was performed on cells containing each of the four electrolyte additives, and FIG. 7 shows line graphs of panel (a) and panel (b) normalized discharge capacity; panel (c) and panel (d) charge endpoint capacity slippage (normalized to the second cycle); panel (e) and panel (f) coulombic efficiency; and panel (g) and panel (h) Volume change normalized to the fourth cycle ($\Delta V/\Delta V_4$) measured during UHPC cycling of NMC532/gr pouch cells containing 1% LFO, NaFO, AFO or MAFO additives In FIG. 7, cells were cycled between 3.0-4.3 V in FIG. 7 panels (a), (c), (e) and (g), or 3.0-4.4 V in FIG. 7, panels (b), (d), (f) and (h). In FIG. 7, the performance of NaFO is seen to be similar to LFO suggesting that NaFO will be an excellent electrolyte additive with comparable performance and lifetime metrics to the well-characterized LFO additive. In contrast, AFO and MAFO show significantly greater capacity fade rates, greater charge endpoint capacity slippage, lower coulombic efficiency, and larger $\Delta V/\Delta V_4$ slopes. As such, FIG. 7 demonstrates that LFO or NaFO may be suitable for use as electrolyte additives.

Figure 8:
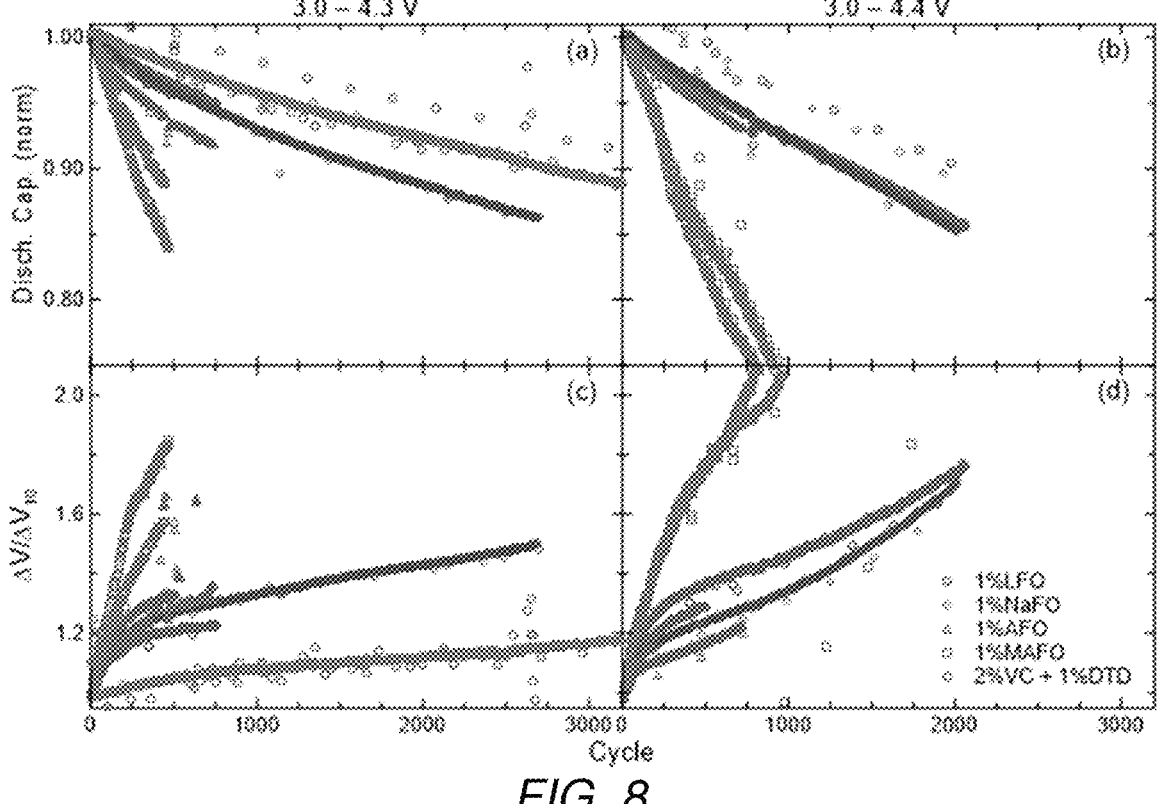
FIG. 8 show line graphs of a panel (a) and panel (b) normalized discharge capacity; and a panel (c) and panel (d) Volume change normalized to the tenth cycle measured during cycling of NMC532/gr pouch cells containing 1% difluorophosphate salt additives according to some embodiments.

The long-term cycling at C/3 rate and 40° C. was measured on cells, as seen in FIG. 8 which shows line graphs of panels (a) and (b) normalized discharge capacity; and panels (c) and (d) Volume change normalized to the tenth cycle ($\Delta V/\Delta V_{10}$) measured during cycling of NMC532/gr pouch cells containing 1% LFO, NaFO, AFO or MAFO additives. In FIG. 8, cells were cycled between 3.0-4.3 V in FIG. 8, panels (a) and (c) or 3.0-4.4 V in FIG. 8, panels (b) and (d). The results of FIG. 8 mirror those of the UHPC tests of FIG. 7, where NaFO displays very similar behavior to LFO as an electrolyte additive and AFO and MAFO lead to decreased performances relative to LFO. However, it is noted that the performance of AFO-containing cells cycled to the higher upper cut-off voltage in this work (i.e., those cycled 3.0-4.4 V) performed relatively more similarly to the LFO- and NaFO-containing cells.

Without being bound by theory, the observation that NaFO and LFO perform very similarly suggest that the beneficial nature of LFO is attributable to the difluorophosphate anion, rather than some effect of the added lithium cation. In some embodiments, the limited solubility of KFO indicates that the cation of the difluorophosphate may not simply be any alkali metal. Finally, the poor electrochemical performance of AFO and MAFO as electrolyte additives demonstrate that ammonium and tetraalkylammonium cations may have negative effects on the long-term stability of lithium-ion cells. In the case of AFO, the formation of lithium nitride at the negative electrode is suspected and suggested to be a poor SEI component.

Table A provides a summary of the cells with LFO and NaFO additives depicted in FIG. 8. Measurements of LFO and NaFO cells at 40° C. with upper cutoff voltages (UVC) of 4.3 or 4.4 were conducted for a total number of cycles (n), where Qdn/Qd3 is the capacity of the total number of cycles (n) divided by the capacity of the third cycle. Qdn/Qd3 is used as an indication of the fraction of capacity remaining after n cycles compared to the third cycle.

TABLE A

| | Summary of difluorophosphate salts prepared in this work. | | | |
|---|---|---|---|---|
| Additive | Temperature (° C.) | Upper Cutoff Voltage (V) | Total Number of Cycles (n) | Qdn/ Qd3 |
| LFO - #1 | 40 | 4.3 | 754 | 0.95 |
| LFO - #2 | 40 | 4.4 | 2067 | 0.86 |
| NaFO - #1 | 40 | 4.3 | 2698 | 0.86 |
| NaFO - #2 | 40 | 4.4 | 2018 | 0.85 |

As described herein, three new difluorophosphate salt electrolyte additives were synthesized and evaluated in NMC532/graphite pouch cells. Ammonium difluorophosphate (AFO) is readily prepared via a solid-state, benchtop reaction of ammonium fluoride and phosphorus pentoxide that requires only gentle heating to initiate. In one embodiment, the best yield of sodium difluorophosphate (NaFO) was obtained by reacting difluorophosphoric acid and sodium carbonate in 1,2-diemethoxyethane over 3 Å molecular sieves, a very strong drying agent. Tetramethyl-ammonium difluorophosphate (MAFO) was prepared from NaFO via cation-exchange with tetramethylammonium chloride.

Furthermore, NaFO was shown to be an effective electrolyte additive in NMC532/graphite cells relative to LFO used as an additive. In some embodiments, the beneficial nature of NaFO and LFO additives may be attributable to the difluorophosphate anion.

EXAMPLES

A. Benchtop Synthesis of $NH_4PO_2F_2$ (1)

$NH_4F$ (Alfa Aesar, ≥98%; 0.79 g, 21.17 mmol, 6 eq) and $P_4O_{10}$ (Alfa Aesar, ≥98%; 1.00 g, 3.53 mmol, 1 eq) were crushed together in a mortar and pestle and placed inside a brass crucible. This crucible was placed onto a hot plate and heated to maximum heat. When the reaction mixture reached around 90° C., it suddenly reacted, giving off a large amount of heat and a small amount of vapour. At this point the crucible was removed from the hot plate and allowed to cool. The solid was scraped out, ground up using a mortar and pestle, and placed into a 50 mL Erlenmeyer flask. 20 mL ethanol was added, and heated and stirred until the ethanol boiled. At that time the flask was removed from the heat and its contents were filtered. The liquid was evaporated under reduced pressure to give 0.468 g of product (37%). An analogous reaction was attempted substituting NaF (Sigma, 99.9%) for $NH_4F$. The reaction did start at 145° C. and reached 244° C. when it got underway, but only gave a 7% yield of product even when 1,2-dimethoxyethane (Alfa Aesar, ≥99%, stab. with BHT) was used as the extraction solvent. Reactions run using ethanol as the extraction solvent failed to give more than a few mg of desired difluorophosphate product. This reaction failed entirely when $MgF_2$ (Aldrich, 99.9%) was used instead of NaF, even when heated to 275° C.

B. Sealed-Tube Synthesis of $NaPO_2F_2$ (2)

In an inert atmosphere, 1.00 g of P4O10 (3.52 mmol, 1 eq) and 0.90 g of NaF (21.12 mmol, 6 eq) were placed into a sealed stainless steel reactor and heated to 300° C. for 5 or 12 hours. When the reactor cooled down the product was thoroughly crushed using a mortar and pestle, acetone (25 mL) was added, and the reaction stirred for 5 min. Rotary evaporation of the acetone gave some product as shown by NMR, but only a few milligrams at most. The remainder of the product was mainly the undesired monofluorophosphate, Na2PO3F. Whether the reaction was run for 5 or 12 hours did not seem to affect the yield. Subsequent Soxhlet extraction of the white solid using acetone failed to increase product yield.

C. Ball-Mill Synthesis of $NaPO_2F_2$ (3)

The same quantities of reagents were used as in (2), but the reagents were placed inside a high energy ball mill vial in an inert atmosphere, and milled for 2, 6, or 13 hours. As in (2), the product was crushed using a mortar and pestle, extracted with 25 mL of acetone, and stirred for 5 min, followed by rotary evaporation. Some difluorophosphate product was detected by NMR, but the quantities were too low to be isolable (a few mg at most); the remainder of the product was mainly the undesired monofluorophosphate. The extended milling times had no effect on product yield.

D. Hydrolysis of Hexafluorophosphate Salts (4)

2.00 g of $NaPF_6$ (Oakwood Chemicals, 98%; 11.9 mmol, 1 eq), 2.78 g NaCl (ACP Chemicals, ≥99%; 47.9 mmol, 4 eq) were added to 8 mL of DMC in a Nalgene vial. 0.43 mL $H_2O$ (23.8 mmol, 2 eq), was added to this suspension, and the reaction allowed to stir. A slurry formed after 2 hours, but no hydrolysis of hexaflurorophosphate to difluorophosphate was found by NMR even after 4 hours. Adding 3 crushed pellets of NaOH in order to help remove the HCl by-product failed to improve conversion even after waiting 3 days.

E. Cation Exchange Method of Making $NaPO_2F_2$ and $KPO_2F_2$ from $NH_4PO_2F_2$ (5)

$NH_4PO_2F_2$ (0.800 g, 6.72 mmol, 1 eq), was dissolved in 20 mL of t-Butanol. To this, sodium tert-butoxide (Aldrich, 97%; 0.65 g, 6.72 mmol, 1 eq) was added. The mixture was allowed to stir for 1 hour, and then the solids were filtered off. The tert-butanol was evaporated under reduced pressure to yield sodium difluorophosphate (0.417 g, 50%). An analogous method was attempted for the synthesis of $KPO_2F_2$, in which $NH_4PO_2F_2$ (0.800 g, 6.72 mmol, 1 eq), was dissolved in 20 mL of t-Butanol. To this, potassium tert-butoxide (Alfa Aesar, 98%; 0.75 g, 6.72 mmol, 1 eq) was added. After stirring for 1 hour, the tert-butanol was removed under reduced pressure, yielding 0.687 g of solid (73%), and an NMR was taken by dissolving some of the solid in deuterated methanol.

F. Synthesis of $NaPO_2F_2$ from Difluorophosphoric Acid and Sodium Carbonate (6)

$Na_2CO_3$ (Alfa Aesar, ≥99.5%; 0.83 g, 7.82 mmol, 1.1 eq) and around 8 g of 3 Å molecular sieves (Acros Organics, 8 to 12 mesh) were added to 20 mL of 1,2-dimethoxyethane, resulting in a suspension. 1.00 mL of $HOPO_2F_2.5H_2O$ (Oakwood Chemicals, >97%; 7.11 mmol, 1 eq) was added, which resulted in the evolution of carbon dioxide gas. After 1 hour, the reaction mixture was centrifuged twice at 2200 RPM, and the solvent removed under reduced pressure. The crude product was washed with 15 mL of diethyl ether and isolated via suction filtration, affording 1.07 g of $NaPO_2F_2$ (60%). An analogous reaction using $CaCO_3$ failed to produce crystalline product, yielding instead a gummy mess that was hard to purify.

G. Synthesis of $NMe_4PO_2F_2$ from $NaPO_2F_2$ (6)

$NaPO_2F_2$ (0.172 g, 1.39 mmol, 1 eq) was dissolved in 5 mL of acetonitrile. $NMe_4Cl$ (Oakwood Chemicals, 97%; 0.150 g, 1.39 mmol, 1 eq) was added. The reaction was stirred for 30 min, and the solid NaCl was filtered off. The liquid was evaporated under reduced pressure to yield 0.162 g (67%) of $NMe_4PO_2F_2$. These crystals were somewhat soluble in acetone and very soluble in DMSO. Analogous reactions using $NEt_4Cl$ and $NBu_4Cl$ resulted in the formation of oils that were very difficult to purify.

H. Characterization of Products

Products were characterized by solution nuclear magnetic resonance (NMR) spectroscopy. Spectra were collected with a Bruker 500 MHz NMR spectrometer controlled by Top-Spin software. Chemical shifts are reported in ppm referenced to the residual solvent peaks ($^1H$ NMR) or were externally referenced to standard materials ($^{19}F$ and $^{31}P$ NMR).

Products were also characterized by X-ray diffraction. A Siemens D5000 diffractometer equipped with a copper target x-ray tube and a diffracted beam monochromator was used. Samples were measured in air using data collection protocols that took 90 minutes for the entire pattern. No degradation of the materials was observed to occur over those 90 minutes. In the case of $NH_4PO_2F_2$, where the crystal structure is known, Rietveld refinement of the measured powder pattern was performed using the Rietica software.

Materials and Electrolytes

Electrolyte solutions were prepared with $LiPF_6$ (Shen-Zhen Capchem, China ≥99.9%) in a 25:5:70 solvent blend, by mass, of ethylene carbonate, ethyl methyl carbonate (EMC), and dimethyl carbonate (DMC), as received from Capchem (<20 ppm $H_2O$). Solutions were prepared by adding 1%, by mass, $LiPO_2F_2$(Capchem) or the difluorophosphate salt additives prepared in this work (Table 1). Pouch bags were sealed at −10 kPa gauge pressure using a compact vacuum sealer (MSK-115A, MTI Corp.) Solution preparation, materials handling, and pouch bag sealing was performed in an argon-atmosphere glove box.

TABLE 1

Summary of difluorophosphate salts prepared in this work.

| Abbrev. | Name | Formula | CAS # |
|---|---|---|---|
| LFO | Lithium difluorophosphate | $LiPO_2F_2$ | 24389-25-1 |
| NaFO | Sodium difluorophosphate | $NaPO_2F_2$ | 15587-24-3 |
| KFO | Potassium difluorophosphate | $KPO_2F_2$ | 13767-90-3 |
| AFO | Ammonium difluorophosphate | $NH_4PO_2F_2$ | 15252-72-9 |
| MAFO | Tetramethylammonium difluorophosphate | $N(CH_3)_4PO_2F_2$ | N/A |

I. Lithium-Ion Cells

Dry (no electrolyte), vacuum-sealed $LiNi_{0.5}Mn_{0.3}Co_{0.2}O_2$ (NMC532)/graphite pouch cells, with capacity of ~220 mAh at 4.3 V and ~230 mAh at 4.4 V, were received from LiFun Technology (Tianyuan District, Zhuzhou, Hunan, China). The NMC532 material was 'single crystal' and had a proprietary Ti-based coating applied. The negative electrodes were made of an artificial graphite. The cells were cut below the heat seal in an argon-atmosphere glove box, dried under vacuum at 80° C. for 14 h, and then returned to the glove box for filling. Cells were filled with 1.00±0.05 g of solution, sealed at −90 kPa gauge pressure using a compact vacuum sealer (MSK-115A, MTI Corp.), and immediately held at 1.5 V at room temperature (21-25° C.) to prevent corrosion of the copper current collector during the ~24 h wetting period that followed. Cells were then loaded into temperature-controlled boxes (40.0±0.1° C.) and connected to a Maccor 4000 Series automated test system (Maccor Inc.). Because gas formation is frequently observed during formation, storage, and cycling, the pouch cells were clamped using soft rubber (at about 25 kPa gauge pressure) during all electrochemical testing, which has previously been observed to significantly improve the experimental precision.

Solid-electrolyte interphase (SEI) formation was performed by charging cells at C/20 to 4.3 V (at 40° C.), holding at 4.3 V for 1 h, discharging at C/20 to 3.8 V, and then holding cells at 3.8 V for 1 h. Cells were weighed while immersed in high purity water to evaluate the volume change due to gas evolution during formation. Cells were then degassed by cutting the pouch open in an argon-atmosphere glove box, and resealed using the compact vacuum sealer. Electrochemical impedance spectroscopy (EIS) was measured at 10.0±0.1° C. using a BioLogic VMP3 instrument (100 kHz-30 mHz, ±10 mV sinusoidal amplitude). Following formation, cells were taken for either ultrahigh precision coulometry or long-term cycling.

UHPC cycling was performed at 40.0±0.1° C. using a Novonix high precision charger system. Long-term cycling was performed at 40.0±0.1° C. and at C/3 rate between 3.0-4.3 V or 3.0-4.4 V using a Neware testing system. A slow cycle was performed every 50 cycles at C/20 to evaluate impedance growth.

While certain embodiments have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products. For example, any of the components for an energy storage system described herein can be provided separately, or integrated together (e.g., packaged together, or attached together) to form an energy storage system.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and within less than 0.01% of the stated amount, depending on the desired function or desired result.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

The headings provided herein, if any, are for convenience only and do not necessarily affect the scope or meaning of the devices and methods disclosed herein.

What is claimed is:

1. An energy storage device, comprising:

an anode comprising an anode active material consisting of a carbon material;

a cathode;

a housing; and an electrolyte comprising a lithium salt, a solvent, and an additive consisting of sodium difluorophosphate (NaFO) and at least one additional difluorophosphate additive selected from the group consisting of: lithium difluorophosphate (LFO), ammonium difluorophosphate (AFO), tetramethylammonium difluorophosphate (MAFO), potassium difluorophosphate (KFO), and combinations thereof;

wherein the anode, cathode and electrolyte are positioned within the housing;

wherein the electrolyte comprises 0.1 wt. % to 5 wt. % of NaFO, and 0.1 wt. % to 5 wt. % of the additional difluorophosphate additive; and wherein the device has a charge transfer resistance ($R_{ct}$) of less than about 60 Ohms/cm$^2$ after formation at a voltage of 4.3V-4.4V.

2. The device of claim 1, wherein the additional difluorophosphate additive is selected from the group consisting of: ammonium difluorophosphate (AFO), tetramethylammonium difluorophosphate (MAFO), potassium difluorophosphate (KFO), and combinations thereof.

3. The device of claim 1, wherein the additional difluorophosphate additive does not comprise lithium difluorophosphate (LFO).

4. The device of claim 1, wherein the electrolyte comprises about 1 wt. % of NaFO.

5. The device of claim 1, wherein the carbon material is selected from the group consisting of a graphitic material, a graphite, a graphene-containing material, a hard carbon, a soft carbon, carbon nanotubes, a porous carbon, a conductive carbon, and combinations thereof.

6. The device of claim 1, wherein the cathode comprises a cathode active material selected from the group consisting of: lithium nickel manganese cobalt oxide (NMC), lithium manganese oxide (LMO), lithium iron phosphate (LFP), lithium cobalt oxide (LCO), lithium titanate (LTO), lithium nickel manganese oxide (LNMO), lithium nickel cobalt aluminum oxide (NCA), lithium nickel manganese aluminum oxide (NMA) and combinations thereof.

7. The device of claim 1, wherein the lithium salt is selected from the group consisting of: LiPF$_6$, LiBF$_4$, LiClO$_4$, LiN(SO$_2$CF$_3$)$_2$, LiSO$_3$CF$_3$, LiB(C$_2$O$_4$)$_2$, LiN(SO$_2$F)$_2$, LiC$_2$BF$_2$O$_4$, and combinations thereof.

8. The device of claim 1, wherein the electrolyte comprises a solvent selected from the group consisting of: ethylene carbonate (EC), propylene carbonate (PC), vinyl ethylene carbonate (VEC), vinylene carbonate (VC), fluoroethylene carbonate (FEC), dimethyl carbonate (DMC), diethyl carbonate (DEC), ethyl methyl carbonate (EMC), methyl acetate (MA), and combinations thereof.

9. The device of claim 1, wherein the device has a charge transfer resistance ($R_{ct}$) after formation at 4.3V of less than about 60 Ohms/cm$^2$.

10. The device of claim 1, wherein the device has a charge transfer resistance ($R_{ct}$) after formation at 4.4V of less than about 60 Ohms/cm$^2$.

11. The device of claim 1, wherein the device has a capacity after 2000 cycles relative to a capacity after a third cycle (Qd2000/Qd3) at 40° C. and upper cutoff voltage of 4.4V of at least about 0.8.

12. The device of claim 1, wherein the device has a capacity after 2500 cycles relative to a capacity after a third cycle (Qd2500/Qd3) at 40° C. and upper cutoff voltage of 4.3V of at least about 0.8.

13. The device of claim 1, wherein the energy storage device is a battery.

14. A method of fabricating an energy storage device, comprising:

positioning an anode, a cathode and an electrolyte within a housing, wherein the electrolyte comprises a lithium salt, a solvent, and an additive consisting of sodium difluorophosphate (NaFO) and at least one additional difluorophosphate additive selected from the group consisting of: lithium difluorophosphate (LFO), ammonium difluorophosphate (AFO), tetramethylammonium difluorophosphate (MAFO), potassium difluorophosphate (KFO), and combinations thereof;

wherein the anode comprises an anode active material consisting of a carbon material;

wherein the electrolyte comprises 0.1 wt. % to 5 wt. % of NaFO, and 0.1 wt. % to 5 wt. % of the additional difluorophosphate additive;

sealing the housing to form an energy storage device; and forming a solid-electrolyte interphase (SEI) at the anode, wherein forming the SEI comprises charge cycling the energy storage device to a voltage of at least about 4.3V.

15. The device of claim 1, wherein the additional difluorophosphate additive is LFO.

16. The device of claim 1, wherein the additional difluorophosphate additive is selected from AFO and MAFO.

17. The device of claim 1, wherein the additive consists of NaFO and the at least one additional difluorophosphate additive.

18. The device of claim 1, wherein the electrolyte consists of the lithium salt, the solvent, and the additive.

19. The method of claim 14, wherein the electrolyte consists of the lithium salt, the solvent, and the additive.

20. The device of claim 5, wherein the carbon material is a graphite.

\* \* \* \* \*